United States Patent
Schümann et al.

(10) Patent No.: US 8,580,909 B2
(45) Date of Patent: Nov. 12, 2013

(54) HOTMELT PROCESS FOR PRODUCING A CHEMICALLY CROSSLINKED POLYURETHANE FILM

(75) Inventors: Uwe Schümann, Pinneberg (DE); Kirstin Weiland, Hamburg (DE); Sven Hansen, Hamburg (DE); Esther Von Possel, Hamburg (DE)

(73) Assignee: tesa SE, Hamburg (DE)

( * ) Notice: Subject to any disclaimer, the term of this patent is extended or adjusted under 35 U.S.C. 154(b) by 670 days.

(21) Appl. No.: 12/436,279

(22) Filed: May 6, 2009

(65) Prior Publication Data

US 2009/0286950 A1    Nov. 19, 2009

(30) Foreign Application Priority Data

May 13, 2008   (DE) .......................... 10 2008 023 252

(51) Int. Cl.
*C08G 18/10*        (2006.01)

(52) U.S. Cl.
USPC ................... 528/59; 528/60; 528/67; 528/77; 528/85; 428/423.1

(58) Field of Classification Search
USPC ................ 528/67, 60, 59, 77, 85; 428/423.1; 252/182.22, 182.24
See application file for complete search history.

(56) References Cited

U.S. PATENT DOCUMENTS

| | | | |
|---|---|---|---|
| 5,693,584 A | 12/1997 | Le-Khac | |
| 5,712,216 A | 1/1998 | Le-Khac et al. | |
| 5,952,261 A | 9/1999 | Combs | |
| 7,091,300 B2 * | 8/2006 | Luhmann et al. | 528/56 |
| 2002/0056518 A1 * | 5/2002 | Shah | 156/331.4 |
| 2007/0049719 A1 * | 3/2007 | Brauer et al. | 528/44 |

FOREIGN PATENT DOCUMENTS

| | | |
|---|---|---|
| DE | 2 059 570 | 6/1971 |
| DE | 196 4 834 | 7/1971 |
| DE | 22 48 382 | 4/1974 |
| DE | 23 02 564 | 7/1974 |
| DE | 10 003 318 | 8/2001 |
| DE | 10 252 088 | 6/2004 |
| DE | 10 2004 044 086 | 3/2006 |
| DE | 10 2005 039 933 | 3/2007 |
| EP | 0 135 111 | 3/1985 |
| EP | 0 259 094 | 3/1988 |
| EP | 0 305 161 | 3/1989 |
| EP | 0 894 841 | 2/1999 |
| EP | 1 095 993 | 5/2001 |
| EP | 1 469 055 A | 10/2004 |
| EP | 1 757 632 A | 2/2007 |
| JP | 2006182795 A * | 7/2006 |
| WO | 99 51657 | 10/1999 |
| WO | 99 51661 | 10/1999 |
| WO | 99 56874 | 11/1999 |
| WO | 99 59719 | 11/1999 |
| WO | 99 64152 | 12/1999 |
| WO | 99 64493 | 12/1999 |

OTHER PUBLICATIONS

"Polyurethane Handbook", Ed.: by Guenter Oertel, 3rd Edition, 73-90, (1993).
Gaechter and Müller, Taschenbuch der Kunststoff-Additive, Plastic Additives Handbook, Munich 1979, (2 parts).
Kirk-Othmer (3rd) 23, 615 to 627, in Encycl. Polym. Sci. Technol. 14, 125 to 148, 1971.
Ullmann (4th) 8, 21; 15, 529, 676, 2000.
Ullmanns Encyklopädie de rtechnischen Chemie.8, 21, 2000.
Encycl. Polym. Sci. Technol. 14, 125 to 148, 1971.

* cited by examiner

*Primary Examiner* — Michael L Leonard
(74) *Attorney, Agent, or Firm* — Norris McLaughlin & Marcus PA

(57) ABSTRACT

Process for producing a chemically crosslinked polyurethane film, comprising the steps of:
  A) chemically reacting a mixture comprising two or more polyols with one or more polyisocyanates, at least one of the polyols or at least one of the polyisocyanates comprising molecules having a functionality of three or more, to form hydroxyl-functionalized polyurethane hotmelt prepolymer,
  B) reacting the hydroxyl-functionalized polyurethane hotmelt prepolymer with one or more polyisocyanates in a continuously operating mixing assembly,
  C) coating the melt emerging from the mixing assembly onto an incoming web-form material or between two incoming web-form materials, in the course of which the reaction started in step B) continues.

25 Claims, No Drawings

HOTMELT PROCESS FOR PRODUCING A CHEMICALLY CROSSLINKED POLYURETHANE FILM

The present invention relates to a hotmelt process for continuously producing a chemically crosslinked polyurethane film for preferred use as a layer in an adhesive tape or in a self-adhesive article.

Adhesive tapes are able to withstand a high shearing load or any other permanent load which acts on them in the adhered state, such as a peeling load or tip-shear load, for example, and particularly so at relatively high temperatures, for a prolonged time period only when they are chemically crosslinked. Chemical crosslinking must occur for all the layers of the adhesive tape, since all of the layers are affected by the permanent load.

In order to obtain chemical crosslinking in polymer films, and more particularly in those which are used as layers in adhesive tapes, there is a diversity of known technologies. The majority of technologies are founded either on solvent-based, crosslinkable coating systems or on reactive systems, which at room temperature, even without the addition of a solvent, are liquid, syrup-like or paste-like. In the case of the solvent-free reactive systems which are liquid, syrup-like or paste-like at room temperature, the polymer is generally not formed until during the coating operation, whereas in the case of the solvent-based systems the polymer is typically already present, in uncrosslinked form, in solution prior to the coating operation.

Polymer films which are obtained by coating of a polymer in solution in a solvent and subsequent evaporation of the solvent can be crosslinked, for example, by admixing a chemical crosslinker to the polymer in solution in the solvent a short time prior to coating. At room temperature a system of this kind is generally stable for a sufficient time in the light of the requirements of the coating operation. The crosslinking reaction then sets in during the evaporation of the solvent in a drying tunnel at relatively high temperatures, and so, finally, the polymer film undergoes chemical crosslinking.

Solvent-based technologies, however, have the fundamental disadvantage that they are not suited to producing thick coats, especially not when coating is to take place at an economically acceptable speed. Even at coat thicknesses of around 100 to 150 µm, there are increased and visible instances of bubbles being formed by the evaporating solvent, and hence distinct detractions from quality, which then rule out use as a layer in an adhesive tape. Even when thinner coats are being produced, the coating speed is limited considerably by the need to evaporate off the solvent. Moreover, solvent-based coating operations give rise to considerable operating costs as a result of the need to recover or incinerate solvent.

Reactive systems which without addition of solvents, at room temperature, are liquid, syrup-like or paste-like are likewise amenable to crosslinking in a diversity of ways. Many of the two-component polyurethanes, epoxies or silicones that are general knowledge are typical examples of liquid, solvent-free, crosslinkable reactive systems. Adhesive tapes and adhesive-tape layers based on syrup-like components are described in, for example, EP 0 259 094 B1 or EP 0305 161 B1, where the polymer synthesis or the crosslinking is achieved through photopolymerization. Liquid or paste-like reactive systems are described in connection with the production of adhesive-tape layers in, for example, EP 0 894 841 B1 or in EP 1 095 993 B1.

Using solvent-free reactive systems of the type described it is possible to produce both thin and thick coats, a fact which represents a great advantage over solvent-based systems. Moreover, with the systems described, the viscoelastic properties can be adjusted and varied in a variety of ways, and so frequently it is possible to develop customized adhesive-tape layers that are tailored precisely to a particular profile of requirements.

Substances which are liquid, syrup-like or paste-like at room temperature, however, have the disadvantage that in these states they cannot be wound up, or at least not with a constant layer thickness. Only solid polymer films can be wound up with a constant layer thickness. The solidification of solvent-free reactive systems which are liquid at room temperature is coupled to the progress, i.e. the advancement, of the chemical reaction.

The reaction progress requires a certain waiting time. Only when solidification of the film has taken place as a result of a sufficiently high degree of conversion on the part of the chemical reaction in question is it possible to wind up the film that has been coated onto an auxiliary sheet. This imposes considerable limits on the coating rate for such systems.

Systems whose polymer synthesis and whose crosslinking are initiated externally, by UV or EBC radiation, for example, generally have the additional disadvantage that polymer synthesis with consistently homogeneous properties occurs only when the radiation uniformly reaches all of the molecules involved in the polymer synthesis, through the entire thickness of the film. This is often not the case, particularly at high coat thicknesses or with systems that are filled with fillers, and so such films then have an inhomogeneously crosslinked polymer framework.

In order to be able to obtain high coating speeds without a fundamental limitation on thickness, hotmelt coating operations have become established, especially extrusion operations. In an operation of this kind, polymers which are solid at room temperature that are meltable (hotmelts) are shaped in the melted state, at higher temperatures, to form a film, and are generally coated onto an auxiliary sheet. Winding can take place immediately after cooling and hence solidification. The windability is not tied to the progress of a chemical reaction. In the adhesive-tape sector, pressure-sensitive adhesives containing styrene block copolymer, in particular, described for example in DE 10003318 A1 or DE 10252088 A1, are coated in this way.

Thermoplastic polyurethanes as well can be processed in hotmelt operations. DE-A 2059570 describes, for example, a continuous one-step production process for a non-porous thermoplastic polyurethane.

The preparation of thermoplastically processable polyurethanes from a linear, OH-terminated prepolymer prepared initially as an intermediate is described in DE102005039933, for example. Additionally DE 22 48 382 C2 describes the preparation of thermoplastic polyurethanes from OH-terminated prepolymers in a multi-stage operation. EP 0 135 111 B1 describes the preparation of polyurethanes which are branched but are thermoplastically processable, and hence not crosslinked, in a multi-stage process.

Although hotmelt coating operations based on thermoplastic or thermoplastically processable polymers do have the advantages of a high achievable coating rate and of the possibility of producing thick coats, they lead to polymer films with no crosslinking, or at least with inadequate crosslinking, with the consequence that these films are unsuited to use as adhesive-tape layers, where a high permanent load-bearing capacity, particularly at relatively high temperatures, is important.

The extrusion of polyurethane elastomers with accompanying use of triols, which lead to a crosslinked character on the part of the elastomers, is known from, for example, DE-A 1964834 and from DE 23 02 564 C3. Those specifications, however, describe the reaction of liquid starting materials, with the corresponding disadvantage that it is necessary to await the solidification, dependent on the progress of the reaction, before such elastomers are wound up.

Hotmelt coating operations which lead to crosslinked polymer films are known from DE 10 2004 044 086 A1, for example. Described therein is a process for producing an adhesive tape based on a pressure-sensitive acrylate hotmelt adhesive, to which, in the melted state in an extruder, a thermal crosslinker is added.

A disadvantage of the process described therein is the need first to polymerize the pressure-sensitive acrylate hotmelt adhesive in a solvent and the subsequent need to remove this solvent by means of a concentrating extruder. A further disadvantage is the relatively high molecular weight of the polyacrylate (weight-averaged $M_w$: 300 000 to 1 500 000 g/mol). High molecular weights require high processing temperatures and hence high operating costs, and may also lead, in the case of extrusion operations, to unequal polymer properties in machine and cross directions.

It is an object of the present invention to provide a process with which, solventlessly and continuously, chemically crosslinked polymer films which are therefore not meltable can be produced for use as layers in adhesive tapes, the intention being that it should be possible to wind up the films, after coating onto an auxiliary carrier, without the need to wait beforehand for the progress of a reactive process that takes place during the coating operation.

More particularly the following criteria are to be met: the chemical basis of the polymer films is to be chosen such that it affords broad room for variation for the setting of viscoelastic properties, thereby allowing the development of customized adhesive-tape layers tailored to variable, changing profiles of requirements. The process should allow the production not only of carrier layers and pressure-sensitive adhesive layers but also functional layers such as, for example, primer layers. The process ought to be such that it does not have the disadvantages of the prior art, or at least not to the same extent. Preferably, the overall operation, including preparation of intermediates, ought to take place solventlessly, without any intention thereby that the use of solvent should be ruled out completely. Moreover, the crosslinked, non-meltable polymer films ought to have properties that are equal in machine and cross directions.

The dependent claims provide advantageous developments of the process.

The invention accordingly provides the process, described hereinafter, for producing a chemically crosslinked polyurethane film, comprising the following substeps:

A) chemically reacting a mixture comprising two or more polyols with one or more polyisocyanates, at least one of the polyols or at least one of the polyisocyanates comprising molecules having a functionality of three or more, and the ratio of the total number of isocyanate groups to the total number of hydroxyl groups being less than 1.0, to give a hydroxyl-functionalized, meltable reaction product, referred to below as hydroxyl-functionalized polyurethane hotmelt prepolymer, B) introducing the hydroxyl-functionalized polyurethane hotmelt prepolymer and one or more polyisocyanates into a continuously operating mixing assembly wherein a chemical reaction takes place of the hydroxyl-functionalized polyurethane hotmelt prepolymer in the melt with the polyisocyanates, C) coating the melt emerging from the mixing assembly onto an incoming web-form material or between two incoming web-form materials, in the course of which the reaction started in substep B) continues.

Substep A) is a preparation step. In this substep, from liquid or solid polyols, polyisocyanates and, if desired, further polyurethane starting materials, the reaction takes place to give a hydroxyl-functionalized polyurethane hotmelt prepolymer. In particular this polyurethane hotmelt prepolymer is a branched hydroxyl-functionalized polyurethane hotmelt prepolymer.

Polymers or prepolymers with the capacity to be meltable and hence thermoplastically processable are referred to in this specification, as is usual in the terminology of the skilled person, as hotmelts.

By a polyurethane hotmelt prepolymer is meant in this specification a reaction product which is obtained by chemical reaction of a mixture comprising two or more polyols with one or more polyisocyanates and which, when this reaction has reached completion, is so solid and dimensionally stable at room temperature that its processing at room temperature in known mixing assemblies is not possible without the addition of solvents, diluents or other viscosity-lowering additives. Examples of known mixing assemblies include kneading apparatus, internal mixers, extruders, planetary roller extruders, planetary mixers or dissolvers. For the purposes of this specification, a meltable reaction product is able to be processed only with heating, it being possible for the heat to be applied from the outside, by heating, or by shearing. Typical processing temperatures for meltable reaction products for the purposes of this specification are between 70° to 160° C.; they are at least 40° C. Room temperature for the purposes of this specification is the temperature range from 20° C. to 25° C., ideally 23° C.

A meltable reaction product for the purposes of this specification, when the reaction has reached completion, has a complex viscosity, measured using a rheometer in an oscillation experiment with a sinusoidally oscillating shearing stress, in a plate/plate arrangement at a temperature of 23° C. and an oscillation frequency of 10 rad/s, of at least 8000 Pas, preferably at least 10 000 Pas. At 70° C. and a frequency of 10 rad/s the complex viscosity is at least 300 Pas, preferably at least 500 Pas.

The hydroxyl-functionalized polyurethane hotmelt prepolymer already contains branching sites. Branching sites originate from all molecules with a functionality of three or more which are involved in the chemical construction of the hydroxyl-functionalized polyurethane hotmelt prepolymer. The extent of the branching is adjusted, in interplay with the length of the prepolymer chains produced, in such a way that the meltability of this hydroxyl-functionalized polyurethane prepolymer is ensured—in other words, that no crosslinked structures are formed. Only when the portion of branching sites in the prepolymer exceeds a particular level, whose calculation or arithmetic estimation is briefly described below, does gelling set in—that is, crosslinked structures are formed.

The ratio of the total number of isocyanate groups to the total number of hydroxyl groups, referred to below for short as NCO/OH ratio, of the starting materials involved in the molecular construction of the branched, thermoplastically processable, hydroxyl-functionalized polyurethane hotmelt prepolymer must be less than 1.0 in order for hydroxyl functionalization to be achieved. In order to rule out crosslinked structures it is necessary for the point known as the gel point not to be exceeded. The theoretical gel point can be calculated using the gel point equation of P. J. Flory. A formula derived from the Flory equation, for estimating the NCO/OH gelling ratio in reactions of polyurethane formation from diols and triols with diisocyanates in a substoichiometric amount, is as follows:

$$\left(\frac{NCO}{OH}\right)_{gelling} = \frac{1}{1 + \frac{1}{\frac{(Diol\text{-}OH)}{(Triol\text{-}OH)} + 1}}$$

If the actual ratio is at or above the NCO/OH gelling ratio, it is likely that crosslinked structures will form—in other words, that gelling will set in. In actual practice, however, this is frequently not the case, since many of the commercially available diols and triols also include a fraction—the extent of which is usually not defined—of monofunctional molecules. Consequently the formula offers only an approximate marker of the NCO/OH ratio above which the actual gel point will be reached.

Diol-OH in this formula is the total number of hydroxyl groups that originate from bifunctional polyols and are involved in the prepolymer formation reaction. Triol-OH, correspondingly, is the total number of hydroxyl groups attached to trifunctional polyols that are involved in the prepolymer formation reaction. Where, for example, exclusively trifunctional polyols are reacted with diisocyanate to give a hydroxyl-functionalized prepolymer, the critical NCO/OH ratio is 0.5. Above this NCO/OH ratio, it is likely that crosslinked structures will form, and hence that gelling will occur, leading to non-meltable prepolymers.

In order to ensure that the hydroxyl-functionalized polyurethane prepolymer is solid at room temperature it is necessary to ensure that either the crystalline melting point or the glass transition temperature, or both if appropriate, is or are above room temperature. This can be realized in a variety of ways via the selection and compilation of the polyols and polyisocyanates that are involved in the formation reaction to give the hydroxyl-functionalized polyurethane hotmelt prepolymer. For example it is possible to use crystalline polyols which are solid at room temperature, or it is possible to use a high fraction of short-chain polyols, leading, after reaction with the polyisocyanate, to a high fraction of hard segments within the prepolymer structure. Advantageously the hotmelt character can be achieved by making the numerical fraction of the molecules that are involved in the molecular construction of the hydroxyl-functionalized polyurethane hotmelt prepolymer and that have a relative molar mass of less than or equal to 1000 at least 70%, preferably at least 80%. The numerical fraction always corresponds to the amount-of-substance fraction.

With a view to the use of the crosslinked polyurethane film as a layer in an adhesive tape or in a self-adhesive article, it has been found that particularly advantageous viscoelastic properties, which allow the development of customized adhesive-tape layers tailored to variable, changing profiles of requirements, are achieved by maximizing the length of the prepolymer chains that are formed. This is done by setting the ratio of the total number of isocyanate groups to the total number of hydroxyl groups of the starting materials that are involved in the molecular construction of the branched, thermoplastically processable, hydroxyl-functionalized polyurethane hotmelt prepolymer at between greater than 0.90 and less than 0.98. The weight-averaged average molecular weights of the prepolymers obtained are in that case about 50 000 to 150 000 g/mol. This is a region which on the one hand allows trouble-free coating as a hotmelt, without the generation of different machine-direction and cross-direction properties in the resultant film, which are disruptive for practical use, and which, on the other hand, allows the setting of advantageous viscoelastic properties for adhesive-tape applications.

Particularly advantageous viscoelastic properties are obtained, moreover, if a weight fraction of greater than 70% by weight of the polyols that are involved in the formation of the branched, thermoplastically processable, hydroxyl-functionalized polyurethane hotmelt prepolymer are polyether polyols, preferably polypropylene glycols.

An advantageous degree of crosslinking for crosslinked polyurethane film with a view to the use of the crosslinked polyurethane film as a layer in an adhesive tape or in a self-adhesive article is achieved if the numerical fraction of the molecules involved in the molecular construction of the branched, thermoplastically processable, hydroxyl-functionalized polyurethane hotmelt prepolymer that have a functionality of three or more than three is at least 0.5%, preferably at least 2.0%.

Generally speaking, polyurethane prepolymers are prior art in preparation and are described in, for example, "Kunststoff-Handbuch, Polyurethane, Ed.: Guenter Oertel, 3rd Edition, 88-103, (1993)".

Starting materials for preparing the branched, thermoplastically processable, hydroxyl-functionalized polyurethane hotmelt prepolymer in subset A may be all known polyols such as, for example, polyether polyols, especially polyethylene glycols or polypropylene glycols, polyester polyols, polycarbonate polyols, polytetramethylene glycol ethers (polytetrahydrofurans), hydrogenated and non-hydrogenated, hydroxyl-functionalized polybutadiene derivatives, hydrogenated and non-hydrogenated, hydroxyl-functionalized polyisoprenes, hydroxyl-functionalized polyisobutylenes, hydroxyl-functionalized polyolefins, hydrogenated and non-hydrogenated, hydroxyl-functionalized hydrocarbons. Preferred polyols are polypropylene glycols. As polypropylene glycols it is possible to use all commercial polyethers that are based on propylene oxide and on a difunctional starter in the case of the diols and a trifunctional starter in the case of the triols. These include not only the polypropylene glycols prepared conventionally, i.e., in general, with a basic catalyst, such as potassium hydroxide, for example, but also the particularly pure polypropylene glycols which are prepared by DMC (double metal cyanide) catalysis and whose preparation is described in, for example, U.S. Pat. No. 5,712,216, U.S. Pat. No. 5,693,584, WO 99/56874, WO 99/51661, WO 99/59719, WO 99/64152, U.S. Pat. No. 5,952, 261, WO 99/64493 and WO 99/51657. A characteristic feature of the DMC-catalysed polypropylene glycols is that the "nominal" or theoretical functionality of exactly two in the case of the diols or exactly three in the case of the triols is also in fact approximately achieved. In the case of the conventionally prepared polypropylene glycols the "true" functionality is always slightly lower than the theoretical amount, and especially so in the case of polypropylene glycols having a relatively high molecular weight. The cause of this is a secondary rearrangement reaction of the propylene oxide to form allyl alcohol.

Moreover, it is also possible to use all polypropylene glycol diols and triols which include ethylene oxide in copolymerized form, as is the case in numerous commercial polypropylene glycols, in order to obtain an increased reactivity towards isocyanates.

Other isocyanate-reactive compounds as well, such as polyetheramines, for example, may be involved in the construction of the polyurethane hotmelt prepolymer.

Further starting materials may be chain extenders such as, for example, 1,2-ethanediol, 1,2-propanediol, 1,3-propanediol, 2-methyl-1,3-propanediol, 1,4-butanediol, 2,3-butanediol, propylene glycol, dipropylene glycol, 1,4-cyclohexanedimethanol, hydroquinone dihydroxyethyl ether, ethanolamine, N-phenyldiethanolamine, or m-phenylenediamine. Chain extenders are low molecular mass, isocyanate-reactive, difunctional compounds. Crosslinkers can be used as well. Crosslinkers are low molecular mass, isocyanate-reactive compounds having a functionality of more than two. Examples of crosslinkers are glycerol, trimethylolpropane, diethanolamine, triethanolamine and/or 1,2,4-butanetriol.

Monofunctional isocyanate-reactive compounds, such as monools, for example, may likewise be used. They serve as chain terminators and can therefore be used to control the chain length.

In substep A) the selection of the polyisocyanate is guided by the specific properties the hotmelt prepolymer, and also the subsequent crosslinked film, are to be given. Examples of those suitable include isophorone diisocyanate, hexamethylene diisocyanate, dicyclohexylmethane 4,4'-diisocyanate, tolylene diisocyanate, diphenylmethane 4,4'-diisocyanate and m-tetramethylxylene diisocyanate (TMXDI), mixtures of the stated isocyanates, or isocyanates chemically derived from them, for example dimerized, trimerized or polymerized types, containing urea, uretdione or isocyanurate groups for example. When one example of a dimerized type is the HDI uretdione Desmodur N 3400® from Bayer. One example of a trimerized type is the HDI isocyanurate Desmodur N 3300®, likewise from Bayer. Preferred polyisocyanates are aliphatic and cycloaliphatic types. Isophorone diisocyanate is particularly preferred.

In order to accelerate the reaction of the polyols with the polyisocyanate or polyisocyanates it is possible to use all of the catalysts that are known to the skilled person such as, for example, tertiary amines, organobismuth compounds or organotin compounds, to name but a few. The concentration of the catalysts is adapted to the polyisocyanates and polyols used and also to the target residence time in the mixing assembly and the temperature in the mixing assembly. Advantageously the concentration is between 0.01% by weight and 0.5% by weight of the chemically crosslinked polyurethane film to be produced.

In one possible embodiment the polyurethane hotmelt prepolymer from subset A) comprises further formulating constituents such as, for example, fillers, resins, especially tackifying hydrocarbon resins, aging inhibitors (antioxidants), light stabilizers, UV absorbers, rheological additives, and also other auxiliaries and additives.

Fillers which can be used include reinforcing fillers, such as carbon black, for example, and non-reinforcing fillers, such as chalk or barium sulfate, for example. Further examples are talc, mica, fumed silica, silicates, zinc oxide, solid glass microbeads, hollow glass microbeads and/or plastic microbeads of all kinds. Mixtures of the substances stated can also be used.

The use of antioxidants, though advantageous, is not mandatory.

The suitable antioxidants include, for example, sterically hindered phenols, hydroquinone derivatives, amines, organic sulphur compounds and organic phosphorus compounds.

Light stabilizers and UV absorbers can optionally be used as well.

Light stabilizers used include, for example, those disclosed in Gaechter and Müller, Taschenbuch der Kunststoff-Additive, Munich 1979, in Kirk-Othmer (3rd) 23, 615 to 627, in Encycl. Polym. Sci. Technol. 14, 125 to 148, and in Ullmann (4th) 8, 21; 15, 529, 676.

Examples of rheological additives are fumed silicas, phyllosilicates (bentonites), high molecular mass polyamide powders or castor oil derivative powders.

The additional use of plasticizers is likewise possible but ought rather to be avoided on account of their strong tendencies towards migration.

The branched, thermoplastically processable, hydroxyl-functionalized polyurethane hotmelt prepolymer can be prepared batchwise, as for example in a heatable kneading apparatus, planetary mixer or dissolver, or else continuously, as for example in an extruder or by means of a two-component mixing and metering unit. The preparation of the branched, thermoplastically processable, hydroxyl-functionalized polyurethane hotmelt prepolymer may also take place in substeps, with combinations of the mixing processes also being possible. In order to obtain absence of bubbles, preference is giving to mixing under reduced pressure.

In substep B the thermoplastically processable, hydroxyl-functionalized polyurethane hotmelt prepolymer prepared in substep A) is mixed continuously in a mixing assembly in the melt with one or more polyisocyanates having a functionality of at least two, and so is continuously chemically reacted. Continuously means that, in the course of mixing, the compounds to be mixed are supplied constantly and at a uniform rate to the mixing assembly—that is, they are introduced into the said mixing assembly, and the mixture, in which the gradual chemical reaction to give the crosslinked polymer progresses, leaves the mixing assembly at another point, constantly and at a uniform rate. In the mixing assembly, therefore, mixing is accompanied by a constant, uniform flow process or transport process. The residence time of the compounds in the mixing assembly from their introduction to their leaving in the form of a chemically reacting mixture is typically 2 seconds to 5 minutes.

The functionality of the polyisocyanates and the ratio of the total number of isocyanate groups to the total number of hydroxyl groups in the molecular construction of the polymer thereby formed through the continuously progressing chemical reaction are set such that the film, following complete reaction, is chemically crosslinked and hence no longer meltable. In general an NCO/OH ratio of between 1.0 and 1.1 is chosen. An NCO/OH ratio of greater than 1.0, i.e. an NCO excess, leads, as is known, via a reaction with the virtually omnipresent ambient moisture, to an increase in polymer chain length and/or to crosslinking. An NCO/OH ratio of less than 1.0 can be chosen more particularly when polyisocyanates are used that have a functionality of three or more. Suitable polyisocyanates are all polyisocyanates with a functionality of at least two. Suitable polyisocyanates include, for example, all polyisocyanates specified in the description of substep A.

The continuous mixing of the melted thermoplastically processable, hydroxyl-functionalized polyurethane hotmelt prepolymer prepared in substep A with one or more polyisocyanates having a functionality of at least two takes place in a continuously operating mixing assembly, preferably in an extruder, more particularly a twin-screw extruder or planetary roller extruder, or in a heatable two-component mixing and metering unit. Cascaded arrangements of continuous or else discontinuous mixing assemblies are likewise suitable. In accordance with the invention the mixing assembly is designed so as to ensure thorough mixing for a short residence time in the mixing assembly. The addition of the melted thermoplastically processable, hydroxyl-functionalized polyurethane hotmelt prepolymer prepared in substep A and of the polyisocyanates having a functionality of at least two can take place in an extruder at the same point or else at different points, preferably in unpressurized zones. It is favourable if the polyisocyanates having a functionality of at least two are added in finely divided form—as an aerosol or in fine droplets, for example—to the thermoplastically processable, hydroxyl-functionalized polyurethane hotmelt prepolymer.

In a two-component mixing and metering unit the thermoplastically processable, hydroxyl-functionalized polyurethane hotmelt prepolymer is heated and is conveyed in temperature-conditioned form, in the melted state, as a component A, while the polyisocyanates having a functionality of at least two are conveyed as component B. Continuous commixing takes place in a dynamic mixing head or, preferably, in a static mixing pipe, or in a combination of dynamic and static mixing methods.

Optionally in substep B, during the continuous commixing of the thermoplastically processable, hydroxyl-functionalized polyurethane hotmelt prepolymer prepared in substep A, in the melt, with one or more polyisocyanates having a functionality of at least two, it is possible to admix further formulating constituents such as, for example, fillers, resins, especially tackifying hydrocarbon resins, aging inhibitors (antioxidants), light stabilizers, UV absorbers, rheological additives, and other auxiliaries and additives.

The chemical reaction to give the crosslinked polyurethane progresses continuously during and after the continuous commixing of the thermoplastically processable, hydroxyl-functionalized polyurethane hotmelt prepolymer, in the melt, with one or more polyisocyanates having a functionality of at least two. Without catalysis, or with moderate catalysis with a suitable catalyst, the reaction rate is sufficiently slow, and so a thermoplastic processing is still possible for some time. During this time, which is generally of the order of minutes, the continuous shaping must take place of the warm or hot, chemically reacting mixture to form a film, in accordance with substep C. After the shaping operation, the film is allowed to cool to room temperature, as a result of which it solidifies immediately, independently of the progress of the chemical crosslinking reaction. Even at room temperature, the crosslinking reaction continues to progress until it reaches completion. The chemical crosslinking reaction is generally complete at room temperature after one to two weeks. Following complete reaction, the state of crosslinking in the resultant polymer is such that the polymer can no longer be melted.

The continuous shaping of the warm or hot, chemically reacting mixture immediately following the continuous mixing operation of substep B), during the continuously progressing chemical reaction phase in the melt, to give a film which is immediately solid on cooling to room temperature and can be wound up, in accordance with substep C), takes place preferably by means of roller application or by means of an extrusion die, but may also take place by other application methods, such as a comma bar, for example. The shaped film is applied continuously to an incoming web-form carrier material and is subsequently wound up. The incoming web-form carrier material may be, for example, an anti-adhesively treated film or an anti-adhesively treated paper. Alternatively it may be a material precoated with a pressure-sensitive adhesive or with a functional layer, or may be a carrier, or may be any desired combinations of the stated web-form materials.

Surprisingly, and also unforeseeably for the skilled person, it is found that the process of the invention makes it possible, in a hotmelt coating operation, to produce a polymer which is chemically crosslinked but is nevertheless fluid, to an extent suitable for pressure-sensitive adhesive applications, at relatively low coating temperatures. Fluid to an extent suitable for pressure-sensitive adhesive applications means that a stress which is necessary to achieve mechanical deformation of the polymer, such as a longitudinal extension, for example, decreases over time when that deformation is maintained and runs asymptotically towards a limiting value.

Since the prepolymer in particular already contains branches and, moreover, possesses a relatively high molar mass—otherwise it would not be solid at room temperature—the skilled person had, moreover, to expect that immediate gelling occurs after the polyisocyanate has been metered into this prepolymer in the melt, in other words at temperatures well above room temperature, and hence that crosslinked structures would form immediately and would make it impossible for further commixing, and subsequent coating and shaping to a film, to occur. The fact that this does not happen was unforeseeable for the skilled person.

Since, as a result of the hotmelt coating operation, the windability of the film is not coupled to the progress of a reaction or the rate of evaporation of a solvent, but is instead tied only to a rapidity of the cooling of the film, it is possible to obtain very high coating speeds, a fact which represents an economic advantage. Moreover, there are no costs for the heating of a heating-tunnel section and also no costs for solvent incineration or solvent recovery. Since, in the process of the invention, the prepolymer as well can be prepared solventlessly, there are also no costs for solvent incineration or solvent recovery there either.

The absence of solvent in the process of the invention makes it possible in principle to produce polymer films of arbitrary thickness, without bubbles or foam being formed as a result of evaporating solvent.

Because the continuous admixing of the polyisocyanate or polyisocyanates that bring about chemical crosslinking to the branched, thermoplastically processable, hydroxyl-functionalized polyurethane hotmelt prepolymer takes place only a short time before the mixture is shaped to give the film, there is no need for reactive groups to be blocked. Hence at no point in time is there release of blocking agents, which could remain in the film and possibly disrupt the subsequent application.

Because crosslinking is not initiated externally by radiation such as, for example, UV or EBC radiation, a polymer construction with consistently homogeneous properties is achieved even when the film produced is very thick or when the film contains relatively large amounts of fillers. Fillers can be incorporated in relatively large amounts of, for example, 50% or more, both in substep A) and in substep B).

In view of the fact that, as compared with many other thermoplastically processable polymers, a thermoplastically processable, hydroxyl-functionalized polyurethane hotmelt prepolymer generally has a low weight-averaged average molecular weight, it can be processed thermoplastically and melted at comparatively low temperatures. During and after the shaping of the melt to form a film, there are in general no bonding-relevant differences in the film in the machine and cross directions.

Surprisingly and also unforeseeably for the skilled person, the branching of the hotmelt prepolymer allows crosslinked polymer structures to be produced with simultaneously fluid fractions. Polymer structures of this kind lead to viscoelastic properties of the kind that are needed in the adhesive-tape sector for the purpose of obtaining high bond strengths in tandem with high shear strengths. A certain degree of viscous flow is known to be always necessary for increasing adhesion on substrates to be bonded. Moreover, a certain degree of elastic recovery forces (cohesion) is necessary in order to be able to withstand shearing stresses, particularly under hot conditions. Advantageous pressure-sensitive adhesive properties can be obtained not only when the pressure-sensitive adhesive layer is given a correspondingly viscoelastic design but also when this applies to the other layers of an adhesive tape, such as the carrier layer or a primer layer, for example. In contrast, unbranched hotmelt prepolymers, after crosslinking, lead either to polymer structures having a particularly elastic character without notable fluid fractions or else to polymer structures having a very high level of fluid fractions and a very low level of elastic fractions. A degree suitable for pressure-sensitive adhesive applications would be inadequately made in this way. The flow of polymers having too high an elastic character on substrates is very low, and so the adhesion forces they develop are small. Where unbranched hotmelt prepolymers are crosslinked, in turn, only slightly or not at all, and thus have too little an elastic character, very low forces of cohesion are the result.

A branched hotmelt prepolymer prepared by the process of the invention can be crosslinked advantageously even with only difunctional isocyanates.

A further advantage of the process of the invention is to attach the film chemically, reactively, to other layers of an adhesive tape during the crosslinking phase. This is possible because, during the shaping of the mixture in substep C) and for a certain time thereafter, during the continuously progressing reaction, there are still reactive NCO groups present on the film surface.

The intention of the examples below is to describe the invention in more detail, without wishing thereby to restrict the invention.

The test methods below are used to provide brief characterization of the specimens produced by the process described:

Gel Permeation Chromatography (GPC)

The branched, thermoplastically processable, hydroxyl-functionalized polyurethane hotmelt prepolymers from substep A) were characterized by determinations of the number-averaged and weight-averaged average molecular weights by means of gel permeation chromatography (GPC). The measurements were performed at the company Polymer Standards Service at Mainz.

Calibration took place universally with poly(methyl methacrylate). The determinations were made in accordance with analytical method AM 1005. The eluent used was THF/0.1% by volume trifluoroacetic acid (TFAc). The preliminary column used was PSS-SDV, 10 μm, ID 8.0 mm×50 mm, and the column used was PSS-SDV, 10 μm linear one, ID 8.0 mm×300 mm. A TSP P 100 was used for pumping. The flow rate was 0.5 ml/min. The sample concentration was about 1.5 g/l. The injection system was a TSP AS 3000. The injection volume was 100 μl. Measurement was made at 23° C. The detector was a Shodex RI 71. Evaluation was carried out using the PSS-WinGPC Unity program, version 7.20.

Dynamic Mechanical Analysis (DMA) for Determining the Complex Viscosity ($\eta^*$)

The branched, thermoplastically processable, hydroxyl-functionalized polyurethane hotmelt prepolymers from substep A) were characterized additionally via determinations of the complex viscosity by means of dynamic mechanical analysis (DMA).

The measurements were made with the shear stress controlled rheometer DSR 200 N from the company Rheometric Scientific, in an oscillation experiment, with a sinusoidally oscillating shearing stress in a plate/plate arrangement. The complex viscosity was determined in a temperature sweep as an oscillation frequency of 10 rad/s. The complex viscosity $\eta^*$ is defined as follows: $\eta^* = G^*/\omega$ ($G^*$=complex shear modulus, $\omega$=angular frequency).

The further definitions are as follows: $G^* = G''/G'$ ($G''$=viscosity modulus (loss modulus), $G'$=elasticity modulus (storage modulus)).

$G'' = \tau/\gamma \cdot \sin(\delta)$ ($\tau$=shear stress, $\gamma$=deformation, $\delta$=phase angle=phase shift between shear stress vector and deformation vector).

$G' = \tau/\gamma \cdot \cos(\delta)$ ($\tau$=shear stress, $\gamma$=deformation, $\delta$=phase angle=phase shift between shear stress vector and deformation vector).

$\omega = 2\pi \cdot f$ ($f$=frequency).

The thickness of the samples measured was always 1 mm. The sample diameter was in each case 25 mm. The preliminary stress was applied with a load of 3N. For all of the measurements the stress of the sample bodies was 2500 Pa.

Determination of the Tensile Properties in a Stress/Strain Test

The chemically crosslinked polyurethane films obtained from substep C) were stored for two weeks at room temperature and then their stress/strain properties were investigated in machine direction (shaping direction) and in cross direction (direction at an angle of 90° to the shaping direction, in the film plane).

The measurements were made in accordance with DIN EN ISO 527-1 to 3 with the standard test specimens of size 5 A and at a testing speed of 300 mm/min. Measurements were made of the tensile strength and of the associated strain. The tensile strength is the maximum measured force when the test material is extended, divided by the initial cross-sectional area of the sample, and is reported in the units $N/mm^2$. The extension at the tensile strength is the change in length under the maximum measured force, referred to the original measured length of the test strip, and is reported in the unit %.

Determination of the Relaxation Behaviour

The chemically crosslinked polyurethane films obtained from substep C) were stored for two weeks at room temperature and then investigated for their relaxation behaviour in the machine direction (shaping direction) and in the cross direction (direction at an angle of 900 to the shaping direction in the film plane). The investigations of the relaxation behaviour were likewise made in a stress/strain test in a method based on DIN EN ISO 527-1 to 3, using standard test specimens of size 5 A. At a testing speed of 100 mm/min, the material under test was extended 50% in the longitudinal direction, based on the original length of the test strip. The associated tension was measured at the moment the extension of 50% was reached. The stress is defined as the tensile force on the sample body, relative to the initial cross-sectional area within the measurement length. The extension of 50% was further maintained. After a time of five minutes, the stress was determined again. The percentage decrease in the stress is the relaxation:

Relaxation=100·(initial stress−final stress)/initial stress.

Bond Strength

The bond strength was determined in accordance with PSTC-101. In accordance with this method, the adhesive strip under measurement was applied to the substrate (steel), pressed down twice using a 2 kg weight, and then peeled under defined conditions by means of a tensile testing machine. The peel angle was in each case 90°, the peel speed 300 mm/min. The force required for peeling is the bond strength, and is reported in the units N/cm. The adhesive strips under measurement were reinforced on their reverse with a polyester film 25 μm thick.

Shear Test

The shear test took place in accordance with test specification PSTC-107. In accordance with this method, the test strip under measurement was applied to the substrate (steel), pressed on four times using a 2 kg weight, and then exposed to a constant shearing load. The parameter determined is the holding power in minutes.

The bond area was in each case 13×20 mm. The shearing load on this bond area was 1 kg. The measurement was made both at room temperature (23° C.) and at 70° C. The adhesive strips under measurement were reinforced on the reverse with a polyester film 25 μm thick.

The branched, thermoplastically processable, hydroxyl-functionalized polyurethane hotmelt prepolymers as per substep A) were produced in a customary heatable and evacuable mixing vessel with a dissolver stirrer mechanism, from the company Molteni. During the mixing operation, which lasted about two hours in each case, the temperature of the mixture was adjusted to about 70° C. to 100° C., and a vacuum was applied in order to degas the components.

The continuous chemical reaction of the branched, thermoplastically processable, hydroxyl-functionalized polyurethane hotmelt prepolymers by a continuous mixing in the melt with one or more polyisocyanates having a functionality of at least two took place, in the case of some of the experiments, in a heatable two-component mixing and metering unit with a heatable static mixing pipe and toothed-wheel metering pumps with a conveying performance of max. 2 l/min approximately, and, for some other of the experiments, in a twin-screw extruder from the company Leistritz, Germany, reference LSM 30/34. The assembly was electrically heated from the outside to about 70° C. to 90° C. and air-cooled via a variety of fans, and was designed so as to ensure effective commixing of prepolymer and polyisocyanate with a short residence time in the extruder. For this purpose the mixing screws of the twin-screw extruder were arranged such that conveying elements alternated with mixing elements. The respective polyisocyanate was added with suitable metering equipment, using metering assistants, into the unpressurized conveying zones of the twin-screw extruder.

When the chemically reacting mixture of substep B) emerged, with a temperature of around 80° C., from the twin-screw extruder (exit: circular die 5 mm in diameter), its shaping to a film in accordance with substep C) took place directly by means of a downstream two-roll applicator unit, between two incoming, double-sidedly siliconized, 50 μm polyester sheets. In the case of some of the experiments, the incoming, double-sidedly siliconized, 50 μm polyester sheets were precoated with the pressure-sensitive polyacrylate adhesive Durotac 280-1753 from the company National Starch, in a thickness of 50 μm. In these experiments, therefore, the chemically reacting mixture with a temperature of approximately 80° C. was coated between the pressure-sensitive polyacrylate adhesives with direct contact with them. The feed rate was varied between 1 m/min and 20 m/min. After the film had cooled and therefore solidified, one of the incoming, double-sidedly siliconized polyester sheets was immediately removed again. This then gave a windable film.

Some of the films wound up on siliconized polyester sheet without a precoating of pressure-sensitive adhesive were unwound again after a two-week storage time at room temperature, and laminated to the pressure-sensitive polyacrylate adhesive Durotac 280-1753 from the company National Starch, which was present in the form of an adhesive ready-coated out in a thickness of 50 μm onto siliconized polyester sheet. The lamination took place without any pretreatment. The experiments with the pressure-sensitive polyacrylate adhesive served to test for use as a carrier layer or as a functional layer in an adhesive tape.

Table 1 lists the base materials used for producing the chemically crosslinked polyurethane film, in each case with trade name and manufacturer. The raw materials stated are all freely available commercially.

TABLE 1

Base materials used in producing the chemically crosslinked polyurethane films

| Trade name | Chemical bases | Average number-averaged molecular weight $M_n$ (g/mol) | OH— or NCO number (mmol OH/kg or mmol NCO/kg) | Manufacturer/Supplier |
|---|---|---|---|---|
| Voranol P 400 ® | Polypropylene glycol, diol | 400 | 4643 | Dow |
| Voranol 2000L ® | Polypropylene glycol, diol | 2000 | 989 | Dow |
| Voranol CP 6055 ® | Polypropylene glycol, triol | 6000 | 491 | Dow |
| MPDiol ® | 2-methyl-1,3-propanediol | 90.12 | 22193 | Lyondell |
| Lutensol AO7 ® | Ethoxylated $C_{13}C_{15}$ oxo-process alcohol | 520 | 1961 | BASF |
| Vestanat IPDI ® | Isophorone diisocyanate | 222.3 | 8998 | Degussa |
| Desmodur N 3300 ® | Aliphatic polyisocyanate based on hexamethylene diisocyanate | about 579 | 5190 | Bayer |
| Tinuvin 292 ® | Sterically hindered amine, light stabilizer and aging inhibitor | | | Ciba |
| Tinuvin 400 ® | Triazine derivative, UV protectant | | | Ciba |
| Coscat 83 ® | Bismuth trisneodecanoate CAS No. 34364-26-6 | | | Caschem |
| Aerosil R 202 ® | Fumed silica, hydrophobicized | | | Evonik |
| Omyacarb 4BG ® | Ground chalk | | | Omya |

EXAMPLES

Example 1

For producing a chemically crosslinked polyurethane film, the process was employed as follows:

Substep A)

The branched, thermoplastically processable, hydroxyl-functionalized polyurethane hotmelt prepolymer was prepared by homogeneous mixing and therefore reacting of the following starting materials in the proportions specified:

TABLE 2

Composition of the branched, thermoplastically processable, hydroxyl-functionalized polyurethane hotmelt prepolymer from example 1

| Starting material | Weight fraction (% by weight) | Number of OH or NCO groups, based on the percentage weight fraction | Percentage ratio of the number of OH and NCO groups to one another | Percentage ratio of the number of molecules carrying OH or NCO groups to one another (idealized)* |
|---|---|---|---|---|
| Voranol P 400 | 17.23 | 80.00 mmol OH | 21.82 | 22.31 |
| Voranol CP 6055 | 48.88 | 24.00 mmol OH | 6.54 | 4.46 |
| MP Diol | 3.60 | 80.00 mmol OH | 21.82 | 22.31 |
| Voranol 2000L | 8.09 | 8.00 mmol OH | 2.18 | 2.23 |
| Tinuvin 400 | 0.21 | | | |
| Tinuvin 292 | 0.10 | | | |
| Coscat 83 | 0.41 | | | |
| Aerosil R 202 | 2.06 | | | |
| Vestanat IPDI | 19.42 | 174.72 mmol NCO | 47.64 | 48.70 |
| Total | 100.00 | 366.72 | 100.00 | 100.00 |

*calculated from the percentage ratio of the number of OH groups to one another, under the highly idealized assumption that the Voranol P400, the MP Diol and the Voranol 2000L have a functionality of exactly 2, and the Voranol CP 6055 has a functionality of exactly 3.

First of all, all of the starting materials listed, apart from the MP Diol and the Vestanat IPDI, were mixed for 1.5 hours at a temperature of 70° C. and a pressure of 100 mbar. Then the MP Diol was mixed in for 15 minutes and subsequently the Vestanat IPDI, likewise for a period of 15 minutes. The resulting heat of reaction caused the mixture to warm up to 100° C., after which one portion of the mixture was discharged into a reservoir vessel. Another portion was processed further directly in substep B).

The NCO/OH ratio was 0.91. The theoretical gel point is calculated as 0.89. In spite of the exceedance of the theoretical gel point, the branched, hydroxyl-functionalized polyurethane hotmelt prepolymer formed by the reaction was meltable and therefore thermoplastically processable. The reason is assumed to be that some of the polyols used also possess monofunctional fractions.

4.46% of the molecules involved in the molecular construction of the branched, thermoplastically processable, hydroxyl-functionalized polyurethane hotmelt prepolymer were trifunctional (idealized consideration) and therefore capable of forming branched structures.

93.32% of the molecules involved in the molecular construction of the branched, thermoplastically processable, hydroxyl-functionalized polyurethane hotmelt prepolymer had a relative molar mass of less than or equal to 1000 (on idealized consideration).

The resulting prepolymer was solid at room temperature. The complex viscosity $\eta^*$ was 22 000 Pas at room temperature (23° C.) and 5500 Pas at 70° C.

The weight-averaged average molecular weight $M_w$ was 125 000 g/mol, the number-averaged average molecular weight $M_n$ 17 800 g/mol.

Substep B)

The branched, thermoplastically processable, hydroxyl-functionalized polyurethane hotmelt prepolymer from substep A) was supplied continuously to a twin-screw extruder preheated at 80° C. The polyisocyanate was metered in continuously at the same time and at the same point to the twin-screw extruder, in the form of fine droplets. In some of the experiments the polyisocyanate metered in was Vestanat IPDI, in some others it was Desmodur N3300.

In both experiments an NCO/OH ratio of 1.05 was set.

The mixing ratios were therefore as follows:

100 parts by weight prepolymer: 2.99 parts by weight Vestanat IPDI or 100 parts by weight prepolymer: 5.18 parts by weight Desmodur N 3300.

In both experiments, mixing and conveying were carried out continuously. The time which elapsed before the extrudate emerged from the extruder was approximately two minutes.

Substep C)

The extrudate was supplied directly to a two-roll applicator mechanism, where it was coated between two incoming, double-sidedly siliconized polyester sheets and thus shaped to a film. The thickness of the film was 1.0 mm. After cooling to room temperature, the film was wound up, after one of the two siliconized polyester sheets have been removed. In a supplementary experiment, coating took place between two incoming, double-sidedly siliconized polyester sheets that had been precoated with the pressure-sensitive polyacrylate adhesive Durotac 280-1753 from National Starch in a thickness of 50 µm.

Here again, the thickness of the film was 1.0 mm, and the film was likewise wound up after having been cooled to room temperature, and after one of the two siliconized polyester films had been removed.

The wound films were stored at room temperature for two weeks and then tested.

The test results are summarized in Table 3 below.

|  | Reaction of the prepolymer with Vestanat IPDI | | Reaction of the prepolymer with Desmodur N 3300 | |
| --- | --- | --- | --- | --- |
|  | Film without polyacrylate PSA | Film with Durotac280-1753 | Film without polyacrylate PSA | Film with Durotac280-1753 |
| Tensile strength MD (N/mm²) | 0.3 | n.d. | 2.3 | n.d. |
| Tensile strength CD (N/mm²) | 0.3 | n.d. | 2.4 | n.d. |
| Extension MD (%) | 420 | n.d. | 480 | n.d. |
| Extension CD (%) | 410 | n.d. | 490 | n.d. |
| Relaxation MD (%) | 55 | n.d. | 46 | n.d. |
| Relaxation CD (%) | 54 | n.d. | 48 | n.d. |
| Bond strength, steel, 90° angle 300 mm/min (N/cm) | 3.5 | 8.4 | 2.6 | 7.6 |
| Holding power in shear test at room temperature (min) | 2500 | >10000 | 2000 | >10000 |
| Holding power in shear test at 70° C. (min) | 200 | 10000 | 250 | 10000 |
| Meltability (tested up to 200° C.) | not meltable | not meltable | not meltable | not meltable |

For comparison, the bond strength of the Durotac 280-1753 PSA, applied to a polyester sheet 25 µm thick, was 5.9 N/cm.

Example 2

For producing a chemically crosslinked polyurethane film, the process was employed as follows:

Substep A)

The branched, thermoplastically processable, hydroxyl-functionalized polyurethane hotmelt prepolymer this time additionally contained a chain terminator and was prepared by homogeneous mixing and therefore reacting of the following starting materials in the proportions specified:

TABLE 4

Composition of the branched, thermoplastically processable, hydroxyl-functionalized polyurethane hotmelt prepolymer from example 2

| Starting material | Weight fraction (% by weight) | Number of OH or NCO groups, based on the percentage weight fraction | Percentage ratio of the number of OH or NCO groups to one another | Percentage ratio of the number of molecules carrying OH and NCO groups to one another (idealized)* |
| --- | --- | --- | --- | --- |
| Voranol P 400 | 16.69 | 77.48 mmol OH | 21.21 | 21.39 |
| Voranol CP 6055 | 47.34 | 23.25 mmol OH | 6.37 | 4.27 |
| MP Diol | 3.49 | 77.40 mmol OH | 21.19 | 21.37 |
| Voranol 2000L | 7.84 | 7.75 mmol OH | 2.12 | 2.14 |
| Lutensol AO7 ® | 2.47 | 4.84 mmol OH | 1.33 | 2.68 |
| Tinuvin 400 | 0.21 |  |  |  |
| Tinuvin 292 | 0.10 |  |  |  |
| Coscat 83 | 0.41 |  |  |  |
| Aerosil R 202 | 2.06 |  |  |  |
| Vestanat IPDI | 19.40 | 174.52 mmol NCO | 47.78 | 48.15 |
| Total | 100.00 | 365.24 | 100.00 | 100.00 |

*calculated from the percentage ratio of the number of OH groups to one another, under the highly idealized assumption that the Voranol P400, the MP Diol and the Voranol 2000L have a functionality of exactly 2, and the Voranol CP 6055 has a functionality of exactly 3 and the Lutensol AO7 has a functionality of exactly 1.

First of all, all of the starting materials listed, apart from the MP Diol and the Vestanat IPDI, were mixed for 1.5 hours at a temperature of 70° C. and a pressure of 100 mbar. Then the MP Diol was mixed in for 15 minutes and subsequently the Vestanat IPDI, likewise for a period of 15 minutes. The resulting heat of reaction caused the mixture to warm up to 100° C., after which one portion of the mixture was discharged into a reservoir vessel. Another portion was processed further directly in substep B).

The NCO/OH ratio was 0.92. The theoretical gel point is estimated to be somewhat greater than 0.89. The branched, hydroxyl-functionalized polyurethane hotmelt prepolymer formed by the reaction was meltable and therefore thermoplastically processable.

4.27% of the molecules involved in the molecular construction of the branched, thermoplastically processable, hydroxyl-functionalized polyurethane hotmelt prepolymer were trifunctional (idealized consideration) and therefore capable of forming branched structures.

93.59% of the molecules involved in the molecular construction of the branched, thermoplastically processable, hydroxyl-functionalized polyurethane hotmelt prepolymer had a relative molar mass of less than or equal to 1000 (on idealized consideration).

The resulting prepolymer was solid at room temperature. The complex viscosity $\eta^*$ was 20 000 Pas at room temperature (23° C.) and 4800 Pas at 70° C.

The weight-averaged average molecular weight $M_w$ was 115 000 g/mol, the number-averaged average molecular weight $M_n$ 16 400 g/mol.

Substep B)

The branched, thermoplastically processable, hydroxyl-functionalized polyurethane hotmelt prepolymer from substep A) was supplied continuously to a twin-screw extruder preheated at 80° C. The polyisocyanate was metered in continuously at the same time and at the same point to the twin-screw extruder, in the form of fine droplets. In some of the experiments the polyisocyanate metered in was Vestanat IPDI, in some others it was Desmodur N3300.

In both experiments an NCO/OH ratio of 1.05 was set.

The mixing ratios were therefore as follows:

100 parts by weight prepolymer: 2.88 parts by weight Vestanat IPDI or 100 parts by weight prepolymer: 4.99 parts by weight Desmodur N 3300.

In both experiments, mixing and conveying were carried out continuously. The time which elapsed before the extrudate emerged from the extruder was approximately two minutes.

Substep C)

The extrudate was supplied directly to a two-roll applicator mechanism, where it was coated between two incoming, double-sidedly siliconized polyester sheets and thus shaped to a film. The thickness of the film was 1.0 mm. After cooling to room temperature, the film was wound up, after one of the two siliconized polyester sheets have been removed. In a supplementary experiment, coating took place between two incoming, double-sidedly siliconized polyester sheets that had been precoated with the pressure-sensitive polyacrylate adhesive Durotac 280-1753 from National Starch in a thickness of 50 µm.

Here again, the thickness of the film was 1.0 mm, and the film was likewise wound up after having been cooled to room temperature, and after one of the two siliconized polyester films had been removed.

The wound films were stored at room temperature for two weeks and then tested.

The test results are summarized in Table 5 below.

|  | Reaction of the prepolymer with Vestanat IPDI | | Reaction of the prepolymer with Desmodur N 3300 | |
| --- | --- | --- | --- | --- |
|  | Film without polyacrylate PSA | Film with Durotac280-1753 | Film without polyacrylate PSA | Film with Durotac280-1753 |
| Tensile strength MD (N/mm$^2$) | 0.2 | n.d. | 1.8 | n.d. |
| Tensile strength CD (N/mm$^2$) | 0.2 | n.d. | 1.9 | n.d. |
| Extension MD (%) | 680 | n.d. | 760 | n.d. |
| Extension CD (%) | 670 | n.d. | 770 | n.d. |
| Relaxation MD (%) | 67 | n.d. | 64 | n.d. |
| Relaxation CD (%) | 65 | n.d. | 64 | n.d. |
| Bond strength, steel, 90° angle 300 mm/min (N/cm) | 4.7 | 8.4 | 2.9 | 7.3 |
| Holding power in shear test at room temperature (min) | 1100 | >10000 | 2200 | 9500 |
| Holding power in shear test at 70° C. (min) | 50 | 5000 | 250 | 8950 |
| Meltability (tested up to 200° C.) | not meltable | not meltable | not meltable | not meltable |

For comparison, the bond strength of the Durotac 280-1753 PSA, applied to a polyester sheet 25 µm thick, was 5.9 N/cm.

Comparative Example 1

For producing a chemically crosslinked polyurethane film, a process was employed as follows:

Substep A)

An unbranched, thermoplastically processable, hydroxyl-functionalized polyurethane hotmelt prepolymer was prepared by homogeneous mixing and therefore reacting of the following starting materials in the proportions specified:

TABLE 6

Composition of an unbranched, thermoplastically processable, hydroxyl-functionalized polyurethane hotmelt prepolymer from comparative example 1

| Starting material | Weight fraction (% by weight) | Number of OH or NCO groups, based on the percentage weight fraction | Percentage ratio of the number of OH or NCO groups to one another | Percentage ratio of the number of molecules carrying OH and NCO groups to one another (idealized)* |
|---|---|---|---|---|
| Voranol P 400 | 24.57 | 114.08 mmol OH | 22.29 | 22.29 |
| MP Diol | 5.14 | 114.00 mmol OH | 22.27 | 22.27 |
| Voranol 2000L | 40.38 | 39.93 mmol OH | 7.80 | 7.80 |
| Tinuvin 400 | 0.21 | | | |
| Tinuvin 292 | 0.10 | | | |
| Coscat 83 | 0.42 | | | |
| Aerosil R 202 | 2.08 | | | |
| Vestanat IPDI | 27.10 | 243.89 mmol NCO | 47.64 | 47.64 |
| Total | 100.00 | 511.90 | 100.00 | 100.00 |

*calculated from the percentage ratio of the number of OH groups to one another, under the highly idealized assumption that the Voranol P400, the MP Diol and the Voranol 2000L have a functionality of exactly 2.

First of all, all of the starting materials listed, apart from the MP Diol and the Vestanat IPDI, were mixed for 1.5 hours at a temperature of 70° C. and a pressure of 100 mbar. Then the MP Diol was mixed in for 15 minutes and subsequently the Vestanat IPDI, likewise for a period of 15 minutes. The resulting heat of reaction caused the mixture to warm up to 100° C., after which one portion of the mixture was discharged into a reservoir vessel. Another portion was processed further directly in substep B).

The NCO/OH ratio was 0.91. The theoretical gel point is calculated as 1.0. The unbranched, hydroxyl-functionalized polyurethane hotmelt prepolymer formed by the reaction was solid at room temperature, meltable and therefore thermoplastically processable. None of the molecules involved in the molecular construction of the unbranched, thermoplastically processable, hydroxyl-functionalized polyurethane hotmelt prepolymer were trifunctional (0.0% of the molecules involved were trifunctional). Therefore, it was not possible for any branched structures to form.

92.20% of the molecules involved in the molecular construction of the unbranched, thermoplastically processable, hydroxyl-functionalized polyurethane hotmelt prepolymer had a relative molar mass of less than or equal to 1000 (on idealized consideration).

The resulting prepolymer was solid at room temperature. The complex viscosity η* was 16 000 Pas at room temperature (23° C.) and 500 Pas at 70° C.

The weight-averaged average molecular weight $M_w$ was 75 000 g/mol, the number-averaged average molecular weight $M_n$ 14 800 g/mol.

Substep B)

The unbranched, thermoplastically processable, hydroxyl-functionalized polyurethane hotmelt prepolymer from substep A) was supplied continuously to a twin-screw extruder preheated at 80° C. The polyisocyanate was metered in continuously at the same time and at the same point to the twin-screw extruder, in the form of fine droplets. In some of the experiments the polyisocyanate metered in was Vestanat IPDI, in some others it was Desmodur N3300.

In both experiments an NCO/OH ratio of 1.05 was set.

The mixing ratios were therefore as follows:

100 parts by weight prepolymer: 4.20 parts by weight Vestanat IPDI or 100 parts by weight prepolymer: 7.28 parts by weight Desmodur N 3300.

In both experiments, mixing and conveying were carried out continuously. The time which elapsed before the extrudate emerged from the extruder was approximately two minutes.

Substep C)

The extrudate was supplied directly to a two-roll applicator mechanism, where it was coated between two incoming, double-sidedly siliconized polyester sheets and thus shaped to a film. The thickness of the film was 1.0 mm. After cooling to room temperature, the film was wound up, after one of the two siliconized polyester sheets have been removed. In a supplementary experiment, coating took place between two incoming, double-sidedly siliconized polyester sheets that had been precoated with the pressure-sensitive polyacrylate adhesive Durotac 280-1753 from National Starch in a thickness of 50 μm.

Here again, the thickness of the film was 1.0 mm, and the film was likewise wound up after having been cooled to room temperature, and after one of the two siliconized polyester films had been removed.

The wound films were stored at room temperature for two weeks and then tested.

The test results are summarized in Table 7 below.

| | Reaction of the prepolymer with Vestanat IPDI | | Reaction of the prepolymer with Desmodur N 3300 | |
|---|---|---|---|---|
| | Film without polyacrylate PSA | Film with Durotac280-1753 | Film without polyacrylate PSA | Film with Durotac280-1753 |
| Tensile strength MD (N/mm²) | 0.2 | n.d. | 0.9 | n.d. |
| Tensile strength CD (N/mm²) | 0.2 | n.d. | 0.7 | n.d. |

-continued

| | Reaction of the prepolymer with Vestanat IPDI | | Reaction of the prepolymer with Desmodur N 3300 | |
|---|---|---|---|---|
| | Film without polyacrylate PSA | Film with Durotac280-1753 | Film without polyacrylate PSA | Film with Durotac280-1753 |
| Extension MD (%) | 1180 | n.d. | 980 | n.d. |
| Extension CD (%) | 1210 | n.d. | 990 | n.d. |
| Relaxation MD (%) | 95 | n.d. | 89 | n.d. |
| Relaxation CD (%) | 94 | n.d. | 91 | n.d. |
| Bond strength, steel, 90° angle 300 mm/min (N/cm) | 3.5 | 7.4 | 2.2 | 5.6 |
| Holding power in shear test at room temperature (min) | 100 | 120 | 210 | 320 |
| Holding power in shear test at 70° C. (min) | <1 | <1 | 5 | 7 |
| Meltability (tested up to 200° C.) | meltable | meltable | not meltable | not meltable |

For comparison, the bond strength of the Durotac 280-1753 PSA, applied to a polyester sheet 25 μm thick, was 5.9 N/cm.

When an unbranched, thermoplastically processable, hydroxyl-functionalized polyurethane hotmelt prepolymer was used, the polyurethane film had very low forces of cohesion, even in the case of crosslinking with a trifunctional polyisocyanate in substep B. The consequences were very short holding powers in the shear test, especially at 70° C.

The invention claimed is:

1. Process for producing a chemically crosslinked polyurethane film, comprising the steps of
   A) chemically reacting a mixture comprising two or more polyols with one or more polyisocyanates, at least one of the polyols or at least one of the polyisocyanates comprising molecules having a functionality of three or more, the ratio of the total number of isocyanate groups to the total number of hydroxyl groups being less than 1.0, to give a hydroxyl-functionalized, meltable reaction product, in the form of a hydroxyl-functionalized polyurethane hotmelt prepolymer,
   B) introducing the hydroxyl-functionalized polyurethane hotmelt prepolymer and one or more polyisocyanates into a continuously operating mixing assembly wherein a chemical reaction takes place between the hydroxyl-functionalized polyurethane hotmelt prepolymer and the polyisocyanates in the melt,
   C) coating the melt emerging from the mixing assembly onto an incoming web-form material or between two incoming web-form materials, in the course of which the reaction between the hydroxyl-functionalized polyurethane hotmelt prepolymer and the polyisocyanates started in step B) continues to form a chemically crosslinked nonmeltable polyurethane film.

2. Process for producing a chemically crosslinked polyurethane film according to claim 1, wherein the hydroxyl-functionalized polyurethane hotmelt prepolymer meltable reaction product of step A) is branched.

3. Process for producing a chemically crosslinked polyurethane film according to claim 1, wherein the ratio of the total number of isocyanate groups to the total number of hydroxyl groups in the polyisocyanates and polyols involved in the chemical reaction to give the hydroxyl-functionalized polyurethane hotmelt prepolymer is between greater than 0.90 and less than 0.98.

4. Process for producing a chemically crosslinked polyurethane film according to claim 1, wherein the numerical fraction of the molecules having a functionality of three or more that are involved in the chemical reaction to give the hydroxyl-functionalized polyurethane hotmelt prepolymer is at least 0.5%.

5. Process for producing a chemically crosslinked polyurethane film according to claim 1, wherein the numerical fraction of the molecules involved in the chemical reaction to give the hydroxyl-functionalized polyurethane hotmelt prepolymer that have a relative molar mass of less than or equal to 1000 is at least 70%.

6. Process for producing a chemically crosslinked polyurethane film according to claim 1, wherein a weight fraction of greater than 70% by weight, based on the polyol fraction, of the polyols involved in the chemical reaction to give the hydroxyl-functionalized polyurethane hotmelt prepolymer are polyether polyols.

7. Process for producing a chemically crosslinked polyurethane film according to claim 1 wherein, in addition to the polyols there are also other isocyanate-reactive compounds involved in the chemical reaction to give the hydroxyl-functionalized polyurethane hotmelt prepolymer.

8. Process for producing a chemically crosslinked polyurethane film according to claim 1, wherein at least one of the polyisocyanates involved in the chemical reaction to give the hydroxyl-functionalized polyurethane hotmelt prepolymer has a functionality of two or greater than two.

9. Process for producing a chemically crosslinked polyurethane film according to claim 1, wherein a weight fraction of greater than 70% by weight, based on the polyisocyanate fraction, of the polyisocyanates involved in the chemical reaction to give the hydroxyl-functionalized polyurethane hotmelt prepolymer are aliphatic or cycloaliphatic polyisocyanates.

10. Process for producing a chemically crosslinked polyurethane film according to claim 1, wherein a weight fraction of greater than 70% by weight, based on the polyisocyanate fraction, of the polyisocyanates involved in the chemical reaction to give the hydroxyl-functionalized polyurethane hotmelt prepolymer comprise isophorone diisocyanate.

11. Process for producing a chemically crosslinked polyurethane film according to claim 1, wherein the chemical reaction to give the hydroxyl-functionalized polyurethane hotmelt prepolymer takes place with addition of a catalyst.

12. Process for producing a chemically crosslinked polyurethane film according to claim 1, wherein the chemical reaction to give the hydroxyl-functionalized polyurethane hotmelt prepolymer takes place with addition of a catalyst comprising bismuth and carbon.

13. Process for producing a chemically crosslinked polyurethane film according to claim 1, wherein the hydroxyl-functionalized polyurethane hotmelt prepolymer comprises fillers, resins, auxiliaries and additives.

14. Process for producing a chemically crosslinked polyurethane film according to claim 1, wherein the ratio of the total number of isocyanate groups to the total number of hydroxyl groups during the chemical reaction of the hydroxyl-functionalized polyurethane hotmelt prepolymer with the polyisocyanates in the melt in a continuously operating mixing assembly is between greater than 0.90 and less than 1.2.

15. Process for producing a chemically crosslinked polyurethane film according to claim 1, wherein the chemical reaction of the hydroxyl-functionalized polyurethane hotmelt prepolymer in the melt with one or more polyisocyanates takes place continuously in an extruder.

16. Process for producing a chemically crosslinked polyurethane film according to claim 1, wherein the chemical reaction of the hydroxyl-functionalized polyurethane hotmelt prepolymer in the melt with one or more polyisocyanates takes place continuously in a two-component mixing and metering unit.

17. Process for producing a chemically crosslinked polyurethane film according to claim 1, wherein the complex viscosity of the hydroxyl-functionalized polyurethane hotmelt prepolymer, measured at 10 rad/second and 23° C., is greater than 8000 Pas.

18. Process for producing a chemically crosslinked polyurethane film according to claim 1, wherein the complex viscosity of the hydroxyl-functionalized polyurethane hotmelt prepolymer, measured at 10 rad/second and 70° C., is greater than 300 Pas.

19. Process for producing a chemically crosslinked polyurethane film according to claim 1, wherein the crosslinked polyurethane film has a thickness of between 20 μm and 3000 μm.

20. Process for producing a chemically crosslinked polyurethane film according to claim 1, wherein the production takes place solventlessly.

21. Process for producing a chemically crosslinked polyurethane film according to claim 1, wherein the chemical reaction to give the hydroxyl-functionalized polyurethane hotmelt prepolymer in accordance with step A) takes place continuously.

22. A carrier layer in an adhesive tape or in a self-adhesive article comprising a chemically crosslinked polyurethane film obtained by the process of claim 1.

23. A pressure-sensitive adhesive layer in an adhesive tape or in a self-adhesive article comprising a chemically crosslinked polyurethane film obtained by the process of claim 1.

24. A functional layer in an adhesive tape or in a self-adhesive article comprising a chemically crosslinked polyurethane film obtained by the process of claim 1.

25. Process of claim 12, wherein said catalyst is a bismuth carboxylate or a bismuth carboxylate derivative.

\* \* \* \* \*